United States Patent
Eriksson et al.

(10) Patent No.: US 8,498,795 B2
(45) Date of Patent: Jul. 30, 2013

(54) METHOD AND SYSTEM FOR CONTROLLING A VEHICLE CRUISE CONTROL

(75) Inventors: Anders Eriksson, Torslanda (SE); Johan Bjernetun, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 13/517,303

(22) PCT Filed: Dec. 21, 2009

(86) PCT No.: PCT/EP2009/009169
§ 371 (c)(1),
(2), (4) Date: Jul. 11, 2012

(87) PCT Pub. No.: WO2011/076226
PCT Pub. Date: Jun. 30, 2011

(65) Prior Publication Data
US 2012/0271524 A1 Oct. 25, 2012

(51) Int. Cl.
*B60T 8/32* (2006.01)
(52) U.S. Cl.
USPC ............ 701/93; 701/101; 701/115; 701/301; 701/409; 701/445; 477/79; 477/107; 477/108; 477/110; 477/111; 123/41.3; 123/325; 123/350; 123/478; 123/236; 429/143; 429/147
(58) Field of Classification Search
USPC ............ 701/52, 53, 54, 64, 93, 95, 101, 115, 701/301, 409, 445; 477/79, 107, 108, 110, 477/111, 115, 118, 121, 124, 134, 168, 181; 123/41.3, 325, 350, 478, 236; 180/51, 55, 180/170, 179; 429/143, 147
See application file for complete search history.

(56) References Cited

U.S. PATENT DOCUMENTS

| 5,038,880 A | 8/1991 | Matsuoka et al. |
| 5,623,408 A * | 4/1997 | Motamedi et al. ............... 701/51 |

(Continued)

FOREIGN PATENT DOCUMENTS

| EP | 1750038 A2 | 2/2007 |
| JP | 03273938 A | 12/1991 |

OTHER PUBLICATIONS

International Search Report (Feb. 9, 2012) for corresponding International application No. PCT/EP2009/009169.

(Continued)

*Primary Examiner* — McDieunel Marc
(74) *Attorney, Agent, or Firm* — WRB-IP LLP (57) ABSTRACT

A method and cruise control system for controlling a vehicle cruise control includes driving the vehicle with the cruise control active and set to maintain a vehicle set target speed, and registering a current vehicle condition, which includes at least a current vehicle position, a currently engaged gear ratio, available gear ratios, current vehicle speed, available maximum propulsion torque and road topography of coming travelling road comprising a next coming uphill slope. Based on the current vehicle condition a downshift is predicted at a coming vehicle position in the coming uphill slope due to vehicle speed decrease and at least one activity is selected which results in that the downshift can be postponed or avoided. The cruise control is controlled according to the selected activity in order to postpone or avoid, for example a downshift from a direct gear and thereby saves fuel.

15 Claims, 5 Drawing Sheets

U.S. PATENT DOCUMENTS

| | | | | |
|---|---|---|---|---|
| 5,839,534 | A * | 11/1998 | Chakraborty et al. | 180/169 |
| 6,076,036 | A * | 6/2000 | Price et al. | 701/93 |
| 6,076,622 | A * | 6/2000 | Chakraborty et al. | 180/169 |
| 6,182,000 | B1 | 1/2001 | Ohta et al. | |
| 6,199,001 | B1 | 3/2001 | Ohta et al. | |
| 6,366,846 | B2 * | 4/2002 | Iriyama | 701/97 |
| 6,370,472 | B1 * | 4/2002 | Fosseen | 701/102 |
| 6,687,595 | B2 * | 2/2004 | Seto et al. | 701/96 |
| 6,845,314 | B2 * | 1/2005 | Fosseen | 701/114 |
| 6,898,507 | B2 * | 5/2005 | Aoyama et al. | 701/93 |
| 7,454,284 | B2 * | 11/2008 | Fosseen | 701/104 |
| 7,703,563 | B2 * | 4/2010 | Aldrich et al. | 180/65.265 |
| 7,955,216 | B2 * | 6/2011 | Makiyama | 477/47 |
| 8,082,089 | B2 * | 12/2011 | Morgan et al. | 701/94 |
| 8,249,763 | B2 * | 8/2012 | Brooks et al. | 701/20 |

OTHER PUBLICATIONS

International Preliminary Report on Patentability (Nov. 14, 2011) for corresponding International application No. PCT/EP2009/009169.

* cited by examiner

METHOD AND SYSTEM FOR CONTROLLING A VEHICLE CRUISE CONTROL

BACKGROUND AND SUMMARY

The present invention relates to a method for controlling a cruise control in a vehicle. The invention also relates to a vehicle cruise control system intended for such method for controlling said cruise control.

The present invention also relates to a computer program, computer program product and a storage medium for a computer all to be used with a computer for executing said method.

Motor vehicles, such as cars, lorries, towing vehicles and buses', are often provided with a so-called cruise control system, also denominated speed control system, for automatically controlling the vehicle speed. Such a cruise control system comprises means, such as a speed sensor, for monitoring the actual vehicle speed. The cruise control system compares the actual vehicle speed with a set target speed. The target speed may for instance be entered into the cruise control system as the prevailing actual vehicle speed when a set switch is actuated by the driver. The cruise control system generates an error signal by comparing the actual vehicle speed with the target speed. The error signal is then for instance used to control an actuator coupled to the fuel pump or to the vehicle throttle in order to change the engine speed until the error signal is substantially zero, i.e. until the actual vehicle speed is equal to the target speed.

EP 1439976 and U.S. Pat. No. 6,990,401 disclose two examples of prior art where the cruise control system has been further developed. Here the cruise control system is a predictive cruise control system utilizing information about current vehicle position and upcoming road topography, that is for example gradients or elevation values for the coming road, in order to control throttle opening in such a way as to increase fuel efficiency.

Figure 1:
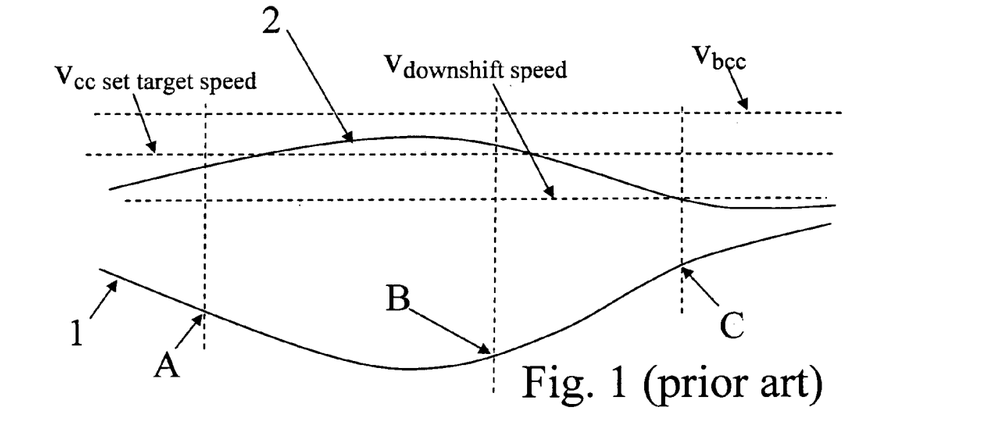
FIG. 1 to 3 diagrammatically show vehicle speed diagrams and corresponding driving conditions, and where said speed diagrams discloses cruise control according FIG. 4 to 9 diagrammatically show vehicle speed diagrams and corresponding driving conditions, and where said speed diagrams disclose cruise control according to different embodiments of the invention.

A problem with prior art cruise control is that unnecessary downshifts can occur during certain vehicle driving conditions. Three examples of such vehicle driving conditions are disclosed in FIGS. 1 to 3. Each of said figures disclose a typical example of a road section profile 1, 21 and 31 where such unnecessary downshifts can occur. Road section profile 1 in FIG. 1 disclose a downhill followed by an uphill slope. An upper curve 2 discloses how the vehicle speed varies when driving said road section profile 1 and a cruise control set on target speed vcc set target speed. In the disclosed example a maximum allowable overspeed vbcc is set for when a brake cruise will activate auxiliary brakes and/or service brakes of said vehicle in order not to exceed said Vbcc when driving in a downhill. With the prevailing vehicle condition a certain gear in a transmission of said vehicle is engaged and a lower vehicle speed limit for when a downshift (vd0wnshift speed) to a lower gear (with higher gear ratio) will occur is determined. Said engaged gear can be a direct gear or a gear where torque is transmitted via gear wheel pairs in the transmission (gearbox). In FIG. 1 when the vehicle is in position A the vehicle is accelerating, and eventually accelerating up to a bit over vcc set target speed after position A. When the vehicle is in position B the uphill slope has started and the vehicle speed is decreasing. In the shown example the inclination is so steep that the available propulsive power of the vehicle is not enough to hold vcc set target speed with the current gear engaged. In position C the vehicle speed has decreased to said v downshift speed and a downshift is performed. In the shown example said downshift results in that vehicle speed starts to increase. A drawback is that fuel efficiency is lost due to propulsive power interruption during said downshift. Even more fuel efficiency will be lost if said downshift is a downshift from a direct gear, since driving with a direct gear engaged is more fuel efficient compared to a gear where torque is transmitted via gear wheel pairs.

Figure 2:
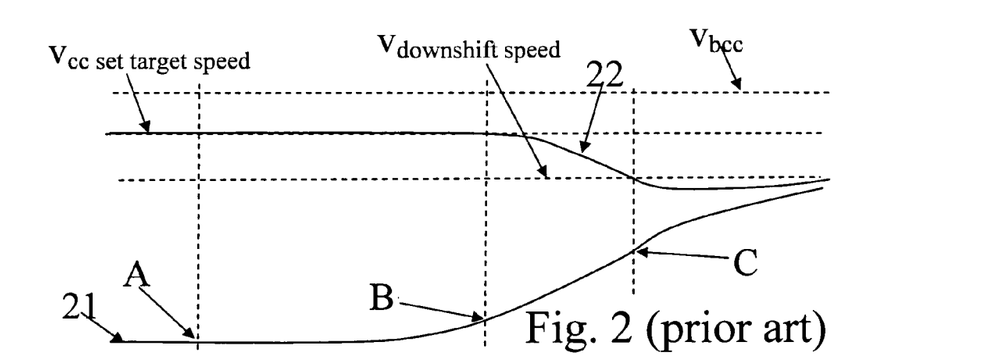
Figure 3:
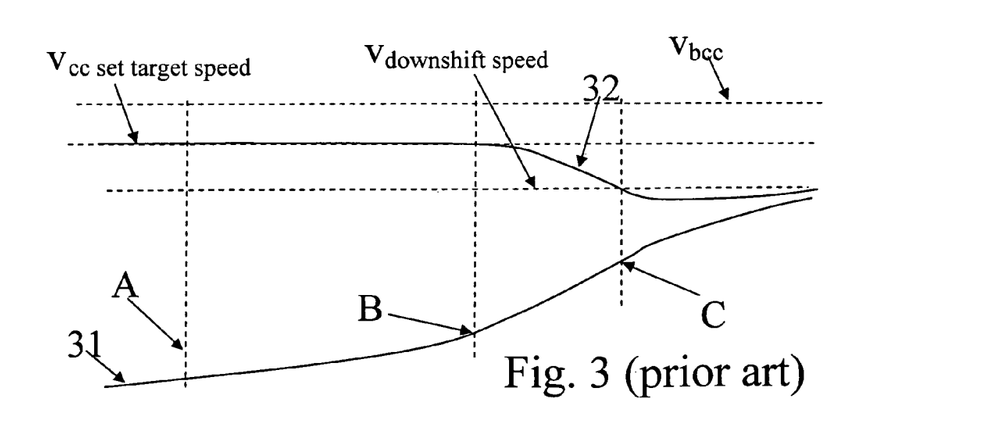

The examples disclosed in FIGS. 2 and 3 disclose corresponding downshifts C for further two different possible road section profiles 21 and 31. Road section profile 21 starts from a horizontal road followed by an uphill slope. Road section profile 31 starts from a light uphill slope, which is followed by an uphill slope.

It is desirable to further develop such a cruise control system where information about current vehicle position and upcoming road topography is used by the cruise control for controlling vehicle speed.

It is desirable to present an improved method for cruise control which can avoid unnecessary downshifts in uphill slopes.

The method according to an aspect of the invention is a method for controlling a cruise control during driving of a vehicle. Said method comprises (includes, but is not necessarily limited to) the steps of:

driving said vehicle with said cruise control active and set to maintain a vehicle set target speed;

registering current vehicle condition, which comprises at least a current vehicle position, a currently engaged gear ratio, available gear ratios, current vehicle speed, available maximum propulsion torque and road topography of coming travelling road comprising a next coming uphill slope;

based on said current vehicle condition predicting a downshift at a coming vehicle position in said coming uphill slope due to vehicle speed decrease and selecting at least one activity which results in that said downshift can be postponed or avoided;

controlling said cruise control according to said selected activity.

According to a first alternative embodiment of said invention said activity comprises the step of:

temporary lowering a downshift limit of said currently engaged gear with a predetermined possible amount to a lowered downshift speed limit.

According to a further embodiment of said invention said method said activity further comprises the steps of:

predicting if said downshift will be postponed enough or avoided;

if predicting that said downshift will not be postponed enough or not avoided then performing said temporary lowering of said downshift limit;

and additionally based on said current vehicle condition, calculating a lowest vehicle speed for a first vehicle position where the vehicle will start to retard in said uphill slope and which results in that said downshift can be enough postponed or avoided;

based on said current vehicle condition controlling said cruise control in order to during vehicle driving towards said first vehicle position increase vehicle speed to said lowest vehicle speed when said vehicle eventually has reached said first vehicle position.

In another embodiment of the invention said activity comprises the steps of:

based on said current vehicle condition calculating a lowest vehicle speed for a first vehicle position where the vehicle will start to retard in said uphill slope which results in that said downshift can be postponed or avoided;

based on said current vehicle condition controlling said cruise control in order to during vehicle driving towards said first vehicle position increase vehicle speed to said lowest vehicle speed when said vehicle eventually has reached said first vehicle position.

In a further embodiment of the invention said increase of a vehicle speed to said lowest vehicle speed is only allowed if the difference between said vehicle set target speed and said lowest vehicle speed is below a predetermined value.

The invention also relates to a vehicle cruise control system that comprises (includes, but is not necessarily limited to) a control unit, driver input interface, vehicle position identifying device, road topography identifying device. Said system is characterized in that said control unit is arranged to perform the above mentioned method steps of said first embodiment.

BRIEF DESCRIPTION OF DRAWINGS

The present invention will be described in greater detail below with reference to the accompanying drawings which, for the purpose of exemplification, shows further preferred embodiments of the invention and also the technical background, and in which.

DETAILED DESCRIPTION

A cruise control system for automatically controlling the vehicle speed can be arranged in a vehicle according to known art. Said cruise control system comprises a control unit for continually processing input signals and deliver output signals to, for example a propulsion unit control for controlling a propulsion unit and if installed also a brake control unit for controlling braking devices in said vehicle in order to maintain a set vehicle speed. Said braking devices can be a service brake and/or auxiliary brake and/or an electric motor/generator (if for example the vehicle is equipped with a hybrid propulsion system). Said vehicle cruise control system further comprises at least a driver input interface. Said control unit is arranged to perform steps of below described inventive functions with the use of information about current vehicle condition.

Said propulsion unit control can be arranged to control a propulsion unit comprising at least a propulsion unit drivingly connected to driven wheels via an automated mechanical transmission (AMT). When said AMT is in an automatic mode the most suitable gear is automatically selected (among several gears) and engaged during driving of said vehicle.

A cruise control in said vehicle is set to maintain vcc set target speed. This can be set by the driver. Thus, said control unit in said cruise control system is arranged to maintain said vcc set target speed. A maximum vehicle overspeed Vbcc Can also be set by the driver in order for the control unit to initiate braking of said vehicle if vehicle speed approaches said Vbcc. This functionality is known as such and is also called brake cruise control. Said maximum vehicle overspeed Vbcc for said vehicle cruise control can be set to be at least equal to or higher than said vcc set target speed. In below described inventive embodiments Vbcc is set higher than vcc set target speed. According to an embodiment of the invention said control unit in said cruise control system is programmed to drive said vehicle with said cruise control active and to perform the following steps:

driving said vehicle with said cruise control active and set to maintain a vehicle set target speed (v CC Set target speed);

registering current vehicle condition, which comprises at least a current vehicle position (A), a currently engaged gear ratio, available gear ratios, current vehicle speed, available maximum propulsion torque and road topography of coming travelling road comprising a next coming uphill slope; based on said current vehicle condition predicting a downshift at a coming vehicle position (C) in said coming uphill slope due to vehicle speed decrease and selecting at least one activity which results in that said downshift can be postponed or avoided;

controlling said cruise control according to said selected activity.

Thus, a coming downshift in a coming uphill slope is predicted when the vehicle is in position A and an activity is selected in order to postpone or avoid said downshift. In this way an unnecessary downshift can be at least postponed or avoided completely during driving said uphill slope. If said currently engaged gear is a direct gear fuel will be saved if driving time with a direct gear engaged can be increased. If said currently engaged gear is a gear where torque is transmitted via gear wheel pairs fuel will be saved if a downshift can be avoided.

Figure 4:
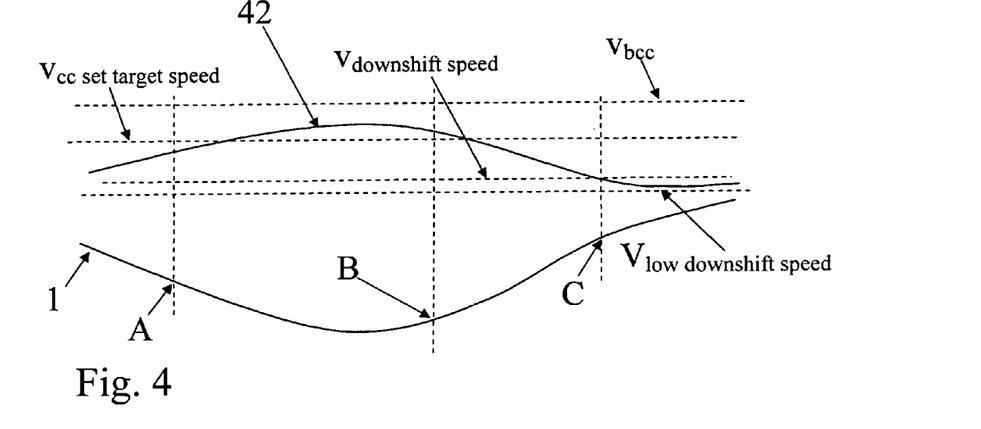

Referring to FIG. 4 the same downhill slope followed by an uphill slope is disclosed as in FIG. 1. Also the speed of the vehicle is controlled in the same way as in the example of FIG. 1. According to one embodiment of the invention said activity comprises the step of:

temporary lowering a downshift limit of said currently engaged gear with a predetermined possible amount to a lowered downshift speed limit (Vlow downshift speed)*

Figure 6:
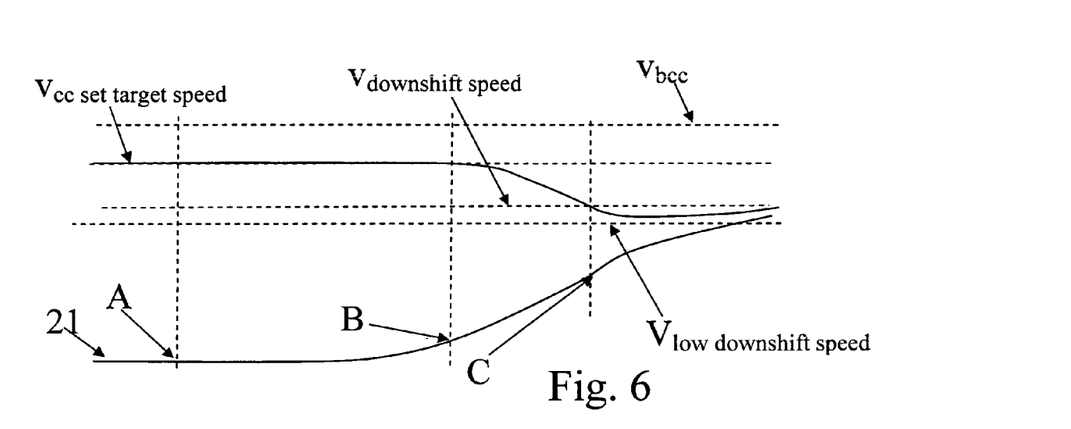
Figure 8:
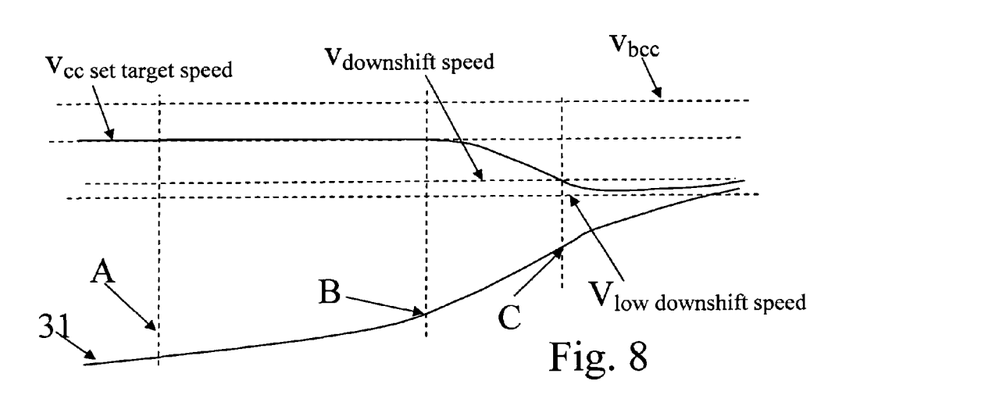

In FIG. 4 said lowered downshift speed limit is disclosed by the line Vlow downshift speed. As can be seen the lowered downshift speed limit is in this shown example below the lowest predicted vehicle speed 42 in said uphill slope. Since the lowered downshift speed limit is below the lowest predicted vehicle speed a downshift at position C will not occur. The difference between said lowest predicted vehicle speed and said lowered downshift speed limit can be predetermined. Said difference can depend on for example propulsion unit configuration, on vehicle travel resistance at said uphill slope, and on engine efficiency in the area between the normal downshift speed the lowered downshift speed (if the engine efficiency should decrease dramatically it would make no sense to decrease engine speed since it would cost extra fuel). The amount of lowering of said downshift speed can depend on for example estimated time for the engine to rotate with a rotational speed below said (ordinary) downshift limit v downshift speed. A typical difference between vd0wnshin speed and Vlow downshift speed can be 100 rpm. In a corresponding way a lowered down shift speed can be used for the road section profiles 21 and 31. For road profile 21 this is disclosed in FIG. 6 and for road profile 31 this is disclosed in FIG. 8. Thus, in the embodiments of FIGS. 6 and 8 the corresponding Vlow downshift speed is used as in FIG. 4.

In a further embodiment of the invention said activity can alternatively comprise the steps of based on said current vehicle condition calculating a lowest vehicle speed for a first vehicle position (B) where the vehicle will start to retard in said uphill slope which results in that said downshift can be postponed or avoided;

based on said current vehicle condition controlling said cruise control in order to during vehicle driving towards said first vehicle position (B) increase vehicle speed to said lowest vehicle speed when said vehicle eventually has reached said first vehicle position (B).

Figure 5:
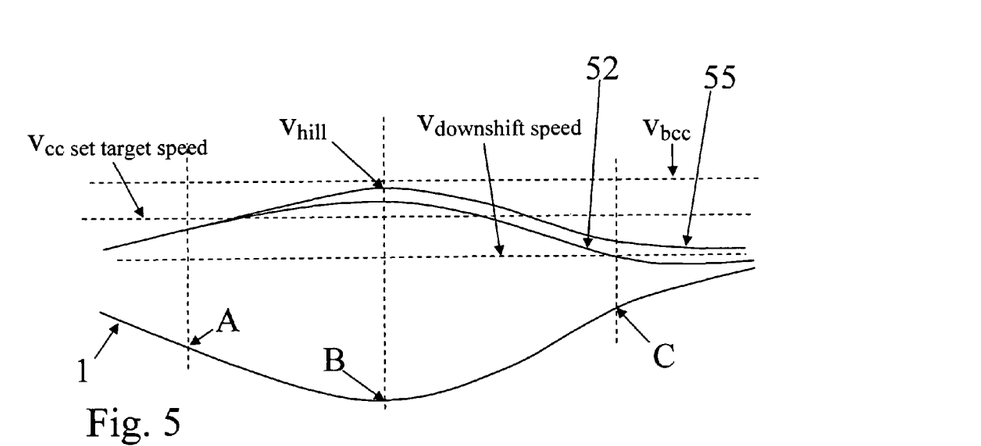
Figure 7:
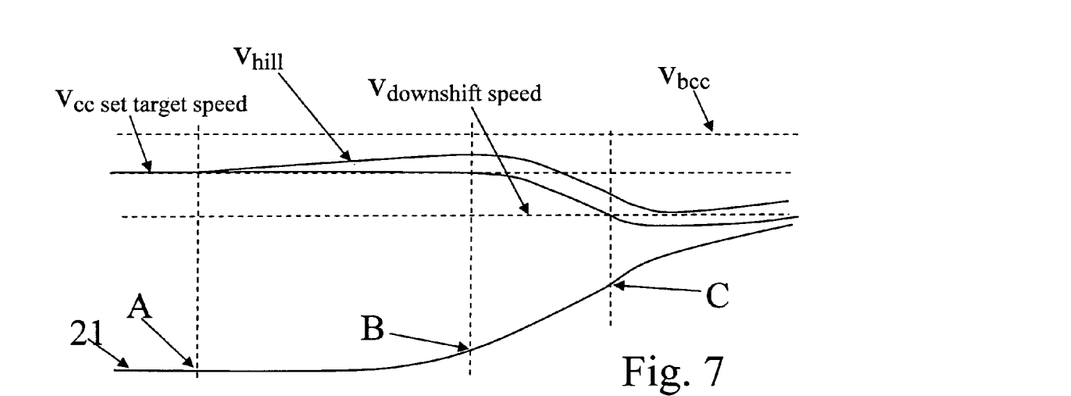
Figure 9:
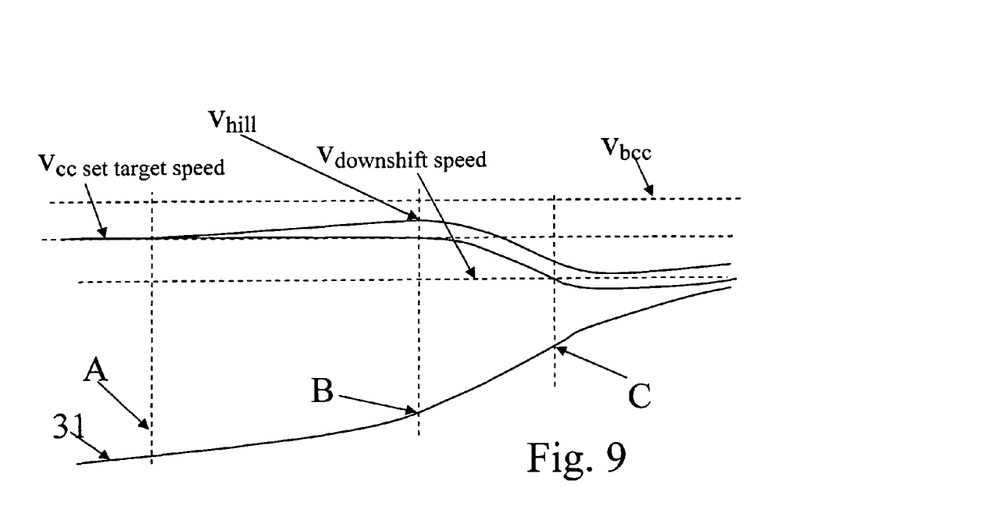

This embodiment is disclosed in FIG. 5 where vehicle speed curve 52 is identical to the vehicle speed curves 42 and 2 in FIGS. 4 and 1 respectively. A vehicle speed curve 55 disclose a vehicle speed curve where it is predicted with the knowledge of the present vehicle conditions that if the vehicle passes said position B with a minimum vehicle speed of vhill then it will be possible to drive through said uphill slope without the vehicle speed decreasing to below the vdownshift speed In this way a downshift at position C can be avoided. As can be seen in FIG. 5 as soon as it is predicted at, for example, position A that a minimum vehicle speed of vhill is needed in position B for avoiding a downshift the vehicle will be accelerated accordingly between said position A and B in order to reach vhill at position B. Simulation can be used with current vehicle condition as input data in order to find out the minimum vehicle speed of vhill. If current vehicle condition results in that it is not possible to avoid or postpone enough said downshift and a worse fuel efficiency is reached than if not accelerating to a Vhill, then said control unit can be programmed to control vehicle speed according to curve 52, that is, no acceleration to a vhill is performed. In the corresponding way a vhill can be used for the road section profiles 21 and 31. For road profile 21 this is disclosed in FIG. 7 and for road profile 31 this is disclosed in FIG. 9. Thus, in the embodiments of FIGS. 7 and 9 the corresponding vhill is used as in FIG. 5.

In a further embodiment of the invention said control unit can be programmed to-combine said activities described in FIGS. 4 and 5 or 6 and 7 or 8 and 9. Thus, said control unit can be programmed to perform the steps of predicting if said downshift will be postponed enough or avoided;

if predicting that said downshift will not be postponed enough or not avoided then performing said temporary lowering of said downshift limit;

and additionally based on said current vehicle condition, calculating a lowest vehicle speed for a first vehicle position where the vehicle will start to retard in said uphill slope and which results in that said downshift can be enough postponed or avoided;

based on said current vehicle condition controlling said cruise control in order to during vehicle driving towards said first vehicle position increase vehicle speed to said lowest vehicle speed when said vehicle eventually has reached said first vehicle position.

The activity where the downshift speed is temporary lowered is more fuel efficient compared to the activity where the vehicle speed is increased to said lowest vehicle speed vhin. Therefore it is first predicted if the temporary lowered downshift speed will be enough or not, and if not both activities can be used.

In another embodiment oldie invention said increase of a vehicle speed to said lowest vehicle speed vhill is only allowed if the difference between said vehicle set target speed vcc set target speed and said lowest vehicle speed vhill is below a predetermined value. Said control unit can further be programmed to not allow a v above a predetermined value such as for example Vbcc.

In a further embodiment of said invention said temporary lowering of a downshift limit of said currently engaged gear is active during driving said uphill slope, which means from for example position B and up to a crest (not shown) or up to a position where the vehicle speed has started to accelerate again and engine rotational speed has increased to above Vdownshift speed.

In a further embodiment the vehicle can be equipped with an Adaptive Cruise Control (ACC). The ACC will register if another vehicle is relatively close in front of said vehicle when, for example, driving in one of the above mentioned vehicle conditions. Said control unit can be programmed to not initiate said increase of a vehicle speed to said lowest vehicle speed v according to one of the above mentioned embodiments as long as said ACC registers said another vehicle relatively close in front of said vehicle.

Figure 10:
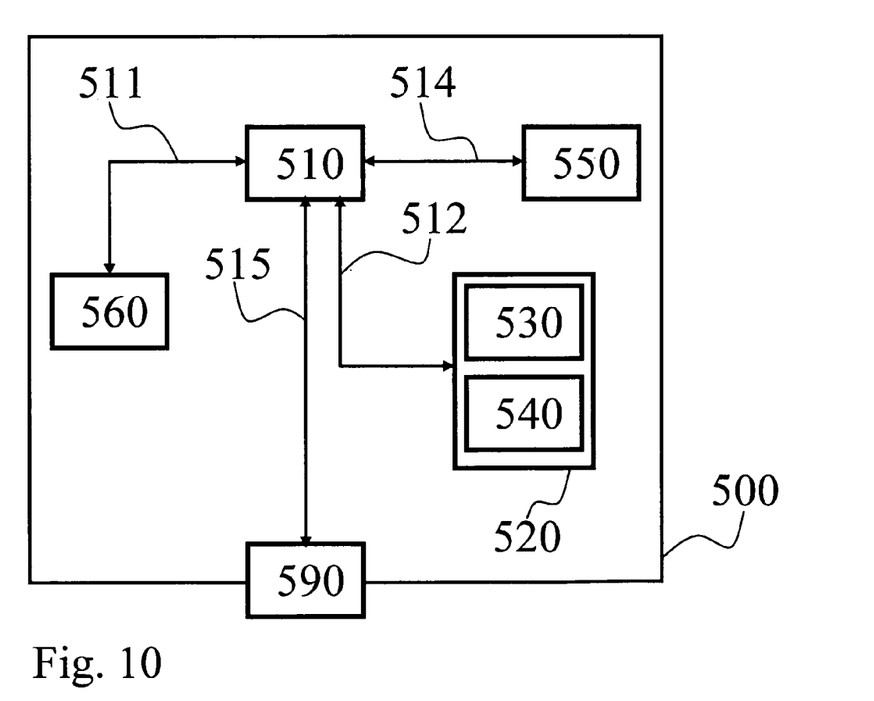
FIG. 10 discloses an embodiment of the invention applied in a computer environment.

FIG. 10 shows an apparatus 500 according to one embodiment of the invention, comprising a nonvolatile memory 520, a processor 510 and a read and write memory 560. The memory 520 has a first memory part 530; in which a computer program for controlling the apparatus 500 is stored. The computer program in the memory part 530 for controlling the apparatus 500 can be an operating system.

The apparatus 500 can be enclosed in, for example, a control unit, such as said above mentioned control unit in said cruise control system. The data-processing unit 510 can comprise, for example, a microcomputer.

The memory 520 also has a second memory part 540, in which a program for controlling a vehicle cruise control according to the invention is stored. In an alternative embodiment, the program for controlling said vehicle cruise control is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. Method for controlling a vehicle cruise control comprising the steps of:

driving the vehicle with the cruise control active and set to maintain a vehicle set target speed (Vcc set target speed);

registering current vehicle condition, which comprises at least a current vehicle position (A), a currently engaged gear ratio, available gear ratios, current vehicle speed, available maximum propulsion torque and road topography of coming travelling road comprising a next coming uphill slope;

based on the current vehicle condition predicting a downshift at a coming vehicle position (C) in the coming uphill slope due to vehicle speed decrease and selecting at least one activity which results in that the downshift can be postponed or avoided;

controlling the cruise control according to the selected activity, and where the activity comprises:

temporary lowering a downshift limit of the currently engaged gear with a predetermined possible amount to a lowered downshift speed limit (Vlow downshift speed);

predicting if the downshift will be postponed enough or avoided;

if predicting that the downshift will not be postponed enough or not avoided then performing the temporary lowering of the downshift limit, and additionally based on the current vehicle condition, calculating by a processor a lowest vehicle speed (vhill) for a first vehicle position (B) where the vehicle will start to retard in the uphill slope and which results in that the downshift can be enough postponed or avoided;

based on the current vehicle condition controlling the cruise control in order to during vehicle driving towards the first vehicle position (B) increase vehicle speed to the lowest vehicle speed when the vehicle eventually has reached the first vehicle position (B).

2. The method as claimed in claim 1, where the temporary lowering of a downshift limit of the currently engaged gear is active during driving the uphill slope.

3. The method as in claim 1, where the increase of a vehicle speed to the lowest vehicle speed (vhill) is only allowed if the difference between the vehicle set target speed (Vcc set target speed) and the lowest vehicle speed (Vhill) is below a predetermined value.

4. The method as claimed in claim 1, where the predicted down shift is a down shift from a direct gear.

5. Method for controlling a vehicle cruise control comprising the steps of:

driving the vehicle with the cruise control active and set to maintain a vehicle set target speed (Vcc set target speed);

registering current vehicle condition, which comprises at least a current vehicle position (A), a currently engaged gear ratio, available gear ratios, current vehicle speed, available maximum propulsion torque and road topography of coming travelling road comprising, a next coming uphill slope;

based on the current vehicle condition predicting a downshift at a coming vehicle position (C) in the coming uphill slope due to vehicle speed decrease and selecting at least one activity which results in that the downshift can be postponed or avoided;

controlling the cruise control according to the selected activity, and where the activity comprising the steps of:

based on the current vehicle condition calculating by a processor a lowest vehicle speed for a first vehicle position (B) where the vehicle will start to retard in the increase vehicle speed to the lowest vehicle speed when the vehicle eventually has reached the first vehicle position (B).

6. The method as in claim 5, where the increase of a vehicle speed to the lowest vehicle speed (vhill) is only allowed if the difference between the vehicle set target speed (Vcc set target speed) and the lowest vehicle speed (Vhill) is below a predetermined value.

7. The method as claimed in claim 5, where the predicted down shift is a down shift from a direct gear.

8. A cruise control system comprising a control unit arranged for maintaining a vehicle set target speed (Vcc set target speed), driver input interface, vehicle position identifying device, road topography identifying device, wherein the control unit is programmed to perform a method for controlling a vehicle cruise control comprising:

driving the vehicle with the cruise control active and set to maintain a vehicle set target speed (Vcc set target speed);

registering current vehicle condition, which comprises at least a current vehicle position (A), a currently engaged gear ratio, available near ratios, current vehicle speed, available maximum propulsion torque and road topography of coming travelling road comprising a next coming uphill slope;

based on the current vehicle condition predicting a downshift at a coming vehicle position (C) in the coming uphill slope due to vehicle speed decrease and selecting at least one activity which results in that the downshift can be postponed or avoided;

controlling the cruise control according to the selected activity, and where the activity comprises:

temporary lowering a downshift limit of the currently engaged gear with a predetermined possible amount to a lowered downshift speed limit (Vlow downshift speed);

predicting if the downshift will be postponed enough or avoided;

if predicting, that the downshift will not be postponed enough or not avoided then performing the temporary lowering of the downshift limit and additionally based on the current vehicle condition, calculating by a processor a lowest vehicle speed (vhill) for a first vehicle position (B) where the vehicle will start to retard in the uphill slope and which results in that the downshift can be enough postponed or avoided;

based on the current vehicle condition controlling the cruise control in order to during vehicle driving towards the first vehicle position (B) increase vehicle speed to the lowest vehicle speed when the vehicle eventually has reached the first vehicle position (B).

9. A computer programmed to perform a method for controlling a vehicle cruise control comprising:

driving the vehicle with the cruise control active and set to maintain a vehicle set target speed (Vcc set target speed);

registering current vehicle condition, which comprises at least a current vehicle position (A), a currently engaged gear ratio, available gear ratios, current vehicle speed, available maximum propulsion torque and road topography of coming travelling road comprising a next coming uphill slope;

based on the current vehicle condition predicting a downshift at a coming vehicle position (C) in the coming uphill slope due to vehicle speed decrease and selecting at least one activity which results in that the downshift can be postponed or avoided;

controlling the cruise control according to the selected activity, and where the activity comprises:

temporary lowering a downshift limit of the currently engaged gear with a predetermined possible amount to a lowered downshift speed limit (Vlow downshift speed);

predicting if the downshift will be postponed enough or avoided;

if predicting that the downshift will not be postponed enough or not avoided then performing the temporary lowering of the downshift limit, and additionally based on the current vehicle condition calculating by a processor a lowest vehicle speed (vhill) for a first vehicle position (B) where the vehicle will start to retard in the uphill slope and which results in that the downshift can be enough postponed or avoided;

based on the current vehicle condition controlling the cruise control in order to during vehicle driving towards the first vehicle position (B) increase vehicle speed to the lowest vehicle speed when the vehicle eventually has reached the first vehicle position (B).

10. A computer program product comprising, a computer program stored on a non-volatile computer readable medium for performing a method for controlling a vehicle cruise control comprising:

driving the vehicle with the cruise control active and set to maintain a vehicle set target speed (Vcc set target speed);

registering current vehicle condition, which comprises at least a current vehicle position (A), a currently engaged gear ratio, available gear ratios, current vehicle speed, available maximum propulsion torque and road topography of coming travelling road comprising a next coming uphill slope;

based on the current vehicle condition predicting a downshift at a coming vehicle position (C) in the coming uphill slope due to vehicle speed decrease and selecting least one activity which results in that the downshift can be postponed or avoided;

controlling the cruise control according to the selected activity, and where the activity comprises:

temporary lowering a downshift limit of the currently engaged gear with a predetermined possible amount to a lowered downshift speed limit (Vlow downshift speed);

predicting if the downshift will be postponed enough or avoided;

if predicting that the downshift will not be postponed enough or not avoided then performing the temporary lowering of the downshift limit, and additionally based on the current vehicle condition, calculating by a processor a lowest vehicle speed (vhill) for a first vehicle position (B) where the vehicle will start to retard in the uphill slope and which results in that the downshift can be enough postponed or avoided;

based on the current vehicle condition controlling the cruise control in order to during vehicle driving towards the first vehicle position (B) increase vehicle speed to the lowest vehicle speed when the vehicle eventually has reached the first vehicle position (B).

11. A non-volatile storage medium for use in a computing environment, the storage medium comprising a computer readable program code to perform a method for controlling a vehicle cruise control comprising:

driving the vehicle with the cruise control active and set to maintain a vehicle set target speed (Vcc set target speed);

registering current vehicle condition, which comprises at least a current vehicle position (A), a currently engaged gear ratio, available gear ratios, current vehicle speed, available maximum propulsion torque and road topography of coming travelling road comprising a next coming uphill slope;

based on the current vehicle condition predicting a downshift at a coming vehicle position (C) in the coming uphill slope due to vehicle speed decrease and selecting at least one activity which results in that the downshift can be postponed or avoided;

controlling the cruise control according to the selected activity, and where the activity comprises:

temporary lowering a downshift limit of the currently engaged gear with a predetermined possible amount to a lowered downshift speed limit (Vlow downshift speed);

predicting if the downshift will be postponed enough or avoided;

if predicting that the downshift will not be postponed enough or not avoided then performing the temporary lowering of the downshift limit, and additionally based on the current vehicle condition, calculating by a processor a lowest vehicle speed (vhill) for a first vehicle position (B) where the vehicle will start to retard in the uphill slope and which results in that the downshift can be enough postponed or avoided;

based on the current vehicle condition controlling the cruise control in order to during vehicle driving towards the first vehicle position (B) increase vehicle speed to the lowest vehicle speed when the vehicle eventually has reached the first vehicle position (B).

12. A cruise control system comprising a control unit arranged for maintaining a vehicle set target speed (Vcc set target speed), driver input interface, vehicle position identifying device, read topography identifying device, wherein the control unit is programmed to perform a method for controlling a vehicle cruise control comprising the steps of:

driving the vehicle with the cruise control active and set to maintain a vehicle set target speed (Vcc set target speed);

registering current vehicle condition, which comprises at least a current vehicle position (A), a currently engaged gear ratio, available gear ratios, current vehicle speed, available maximum propulsion torque and road topography of coming travelling road comprising a next coming uphill slope;

based on the current vehicle condition predicting a downshift at a coming vehicle position (C) in the coming uphill slope due to vehicle speed decrease and selecting at least one activity which results in that the downshift can he postponed or avoided;

controlling the cruise control according to the selected activity, and where the activity comprising the steps of:

based on the current vehicle condition calculating by a processor a lowest vehicle speed for a first vehicle position (B) where the vehicle will start to retard in the increase vehicle speed to the lowest vehicle speed when the vehicle eventually has reached the first vehicle position (B).

13. A computer programmed to perform a method for controlling a vehicle cruise control comprising the steps of:

driving the vehicle with the cruise control active and set to maintain a vehicle set target speed (Vcc set target speed);

registering current vehicle condition, which comprises at least a current vehicle position (A), a currently engaged gear ratio, available gear ratios, current vehicle speed, available maximum propulsion torque and road topography of coming travelling road comprising a next coming uphill slope;

based on the current vehicle condition predicting a downshift at a coming vehicle position (C) in the coming uphill slope due to vehicle speed decrease and selecting at least one activity which results in that the downshift can be postponed or avoided;

controlling the cruise control according to the selected activity, and where the activity comprising the steps of:

based on the current vehicle condition calculating by a processor a lowest vehicle speed for a first vehicle position (B) where the vehicle will start to retard in the increase vehicle speed to the lowest vehicle speed when the vehicle eventually has reached the first vehicle position (B).

14. A computer program product comprising a computer program stored on a non-volatile computer readable medium for performing a method for controlling a vehicle cruise control comprising the steps of:

driving the vehicle with the cruise control active and set to maintain a vehicle set target speed (Vcc set target speed);

registering current vehicle condition, which comprises at least a current vehicle position (A), a currently engaged gear ratio, available gear ratios, current vehicle speed, available maximum propulsion torque and road topography of coming travelling road comprising a next coming uphill slope;

based on the current vehicle condition predicting a downshift at a coming vehicle position (C) in the coming uphill slope due to vehicle speed decrease and selecting at least one activity which results in that the downshift can be postponed or avoided;

controlling the cruise control according to the selected activity, and where the activity comprising the steps of:

based on the current vehicle condition calculating by a processor a lowest vehicle speed for a first vehicle position (B) where the vehicle will start to retard in the increase vehicle speed to the lowest vehicle speed when the vehicle eventually has reached the first vehicle position (B).

15. A non-volatile storage medium for use in a computing environment, the storage medium comprising a computer readable program code to perform a method for controlling a vehicle cruise control comprising the steps of:

driving the vehicle with the cruise control active and set to maintain a vehicle set target speed (Vcc set target speed);

registering current vehicle condition, which comprises at least a current vehicle position (A), a currently engaged gear ratio, available gear ratios, current vehicle speed, available maximum propulsion torque and road topography of coming travelling road comprising a next coming uphill slope;

based on the current vehicle condition predicting a downshift at a coming vehicle position (C) in the coming uphill slope due to vehicle speed decrease and selecting at least one activity which results in that the downshift can be postponed or avoided;

controlling the cruise control according to the selected activity, and where the activity comprising the steps of:

based on the current vehicle condition calculating by a processor a lowest vehicle speed for a first vehicle position (B) where the vehicle will start to retard in the increase vehicle speed to the lowest vehicle speed when the vehicle eventually has reached the first vehicle position (B).

* * * * *